US010182433B2

(12) United States Patent
Callard et al.

(10) Patent No.: US 10,182,433 B2
(45) Date of Patent: Jan. 15, 2019

(54) SYSTEM AND METHOD FOR OVERLAPPING RATE REGION ZONING

(71) Applicant: Huawei Technologies Co., Ltd., Shenzhen (CN)

(72) Inventors: Aaron James Callard, Ottawa (CA); Xu Li, Nepean (CA)

(73) Assignee: Huawei Technologies Co., Ltd., Shenzhen (CN)

(*) Notice: Subject to any disclaimer, the term of this patent is extended or adjusted under 35 U.S.C. 154(b) by 87 days.

(21) Appl. No.: 14/854,677

(22) Filed: Sep. 15, 2015

(65) Prior Publication Data
US 2016/0080975 A1 Mar. 17, 2016

Related U.S. Application Data

(60) Provisional application No. 62/057,111, filed on Sep. 29, 2014, provisional application No. 62/050,659, filed on Sep. 15, 2014.

(51) Int. Cl.
H04W 72/04 (2009.01)
H04W 40/04 (2009.01)
H04W 16/08 (2009.01)
H04W 28/02 (2009.01)
H04W 28/08 (2009.01)

(52) U.S. Cl.
CPC ....... *H04W 72/0426* (2013.01); *H04W 16/08* (2013.01); *H04W 28/0226* (2013.01); *H04W 28/0247* (2013.01); *H04W 28/08* (2013.01); *H04W 40/04* (2013.01)

(58) Field of Classification Search
CPC ............. H04W 72/0426; H04W 28/08; H04W 28/0226; H04W 28/0247; H04W 16/08; H04W 40/04
See application file for complete search history.

(56) References Cited

U.S. PATENT DOCUMENTS

| 5,881,243 A | * | 3/1999 | Zaumen | ................... H04L 45/00 370/238 |
| 6,600,724 B1 | * | 7/2003 | Cheng | ................. H04L 12/1886 370/256 |

(Continued)

OTHER PUBLICATIONS

Liu et al., Multi-Block ADMM for Big Data Optimization in Modern Communication Networks, Apr. 8, 2015.*

(Continued)

*Primary Examiner* — Tejis Daya
(74) *Attorney, Agent, or Firm* — Slater Matsil, LLP (57) ABSTRACT

System and method embodiments are provided for configuring a network to forward traffic from a first network zone to a second network zone. In an embodiment, a first zone controller of the first zone receives information indicating network capability. The information includes a plurality of parameters of a constraint function. The first network controller provisions a network node, e.g., at the second zone, to forward traffic from the first zone to the second zone in accordance with the received information. The information indicating network capability includes one or more variables relating to the constraint. The constraint relates to at least one current traffic level or at least one wireless link in the second zone.

22 Claims, 5 Drawing Sheets

(56) References Cited

U.S. PATENT DOCUMENTS

| | | | | |
|---|---|---|---|---|
| 6,606,303 B1* | 8/2003 | Hassel | H04L 45/04 | 370/238 |
| 7,209,975 B1* | 4/2007 | Zang | H04L 41/0663 | 370/401 |
| 8,493,869 B2* | 7/2013 | Udupi | H04L 45/44 | 370/231 |
| 8,665,835 B2 | 3/2014 | Hussein et al. | | |
| 8,855,118 B2* | 10/2014 | Kannan | H04L 45/64 | 370/392 |
| 9,038,151 B1* | 5/2015 | Chua | H04L 45/02 | 709/223 |
| 9,577,925 B1* | 2/2017 | Bahadur | H04L 45/50 | |
| 9,712,426 B2* | 7/2017 | Lu | H04L 45/16 | |
| 2004/0219912 A1* | 11/2004 | Johansson | H04W 24/02 | 455/424 |
| 2004/0252643 A1 | 12/2004 | Joshi | | |
| 2005/0256972 A1* | 11/2005 | Cochran | H04L 69/329 | 709/245 |
| 2006/0126527 A1* | 6/2006 | Cheung | G06Q 40/04 | 370/252 |
| 2006/0200579 A1* | 9/2006 | Vasseur | H04L 45/04 | 709/238 |
| 2008/0130627 A1* | 6/2008 | Chen | H04L 45/02 | 370/351 |
| 2009/0028161 A1 | 1/2009 | Fullarton et al. | | |
| 2009/0285101 A1* | 11/2009 | Lu | H04L 41/12 | 370/238 |
| 2009/0300183 A1* | 12/2009 | Feng | G06F 9/5038 | 709/226 |
| 2009/0323530 A1 | 12/2009 | Trigui et al. | | |
| 2011/0090791 A1* | 4/2011 | Udupi | H04L 45/04 | 370/231 |
| 2011/0242995 A1* | 10/2011 | Zhang | H04L 45/00 | 370/252 |
| 2012/0069740 A1* | 3/2012 | Lu | H04L 45/04 | 370/238 |
| 2012/0224506 A1* | 9/2012 | Gredler | H04L 45/04 | 370/254 |
| 2013/0034103 A1* | 2/2013 | Chen | H04L 45/124 | 370/400 |
| 2013/0064079 A1* | 3/2013 | Zhang | H04L 43/026 | 370/230 |
| 2013/0080307 A1 | 3/2013 | Hoffberg | | |
| 2013/0128894 A1 | 5/2013 | Shah et al. | | |
| 2013/0237202 A1* | 9/2013 | Tokgoz | H04W 28/0289 | 455/418 |
| 2013/0244671 A1* | 9/2013 | Resende | H04W 36/385 | 455/446 |
| 2013/0250770 A1* | 9/2013 | Zou | H04L 47/19 | 370/238 |
| 2014/0094186 A1* | 4/2014 | Barberis | H04W 24/02 | 455/453 |
| 2014/0180957 A1* | 6/2014 | Arunapuram | G06Q 10/08355 | 705/338 |
| 2014/0277599 A1* | 9/2014 | Pande | G06Q 50/06 | 700/22 |
| 2014/0369394 A1* | 12/2014 | Ruuska | H04W 16/28 | 375/224 |
| 2014/0376371 A1* | 12/2014 | Flinck | H04L 45/04 | 370/230 |
| 2015/0036505 A1* | 2/2015 | Sparks | H04L 47/11 | 370/236 |
| 2015/0131675 A1* | 5/2015 | Chen | H04L 45/507 | 370/450 |
| 2015/0131989 A1* | 5/2015 | Syed | H04L 41/0803 | 398/45 |
| 2015/0181317 A1* | 6/2015 | Yin | H04Q 11/0062 | 398/45 |
| 2015/0188767 A1* | 7/2015 | Li | H04L 41/0823 | 370/254 |
| 2015/0319078 A1* | 11/2015 | Lee | H04L 12/6418 | 370/392 |
| 2016/0014615 A1* | 1/2016 | Shivashankar | H04W 28/18 | 455/446 |
| 2016/0020946 A1* | 1/2016 | Morper | H04L 41/0806 | 709/222 |
| 2016/0315847 A1* | 10/2016 | Zhang | H04L 12/6418 | |

OTHER PUBLICATIONS

Nikolai Matni, Optimal Zero-Queue Congestion Control using ADMM, May 26, 2017.*

Boner, "The Road to AKKA Cluster and Beyond," CTO TYPESAFE, Dec. 3, 2013, 299 pages.

Dixon, "Consistency Trade-Offs for SDN Controllers," IBM, Open Daylight Summit, Feb. 5, 2014, 16 pages.

Gilmore, et al., "A Linear Programming Approach to the Cutting-Stock Problem," Operations Research, vol. 9, No. 6, Nov.-Dec. 1961, pp. 849-859.

Gude, et al., "NOX: Towards an Operating System for Networks," ACM SIGCOMM Computer Communication Review, vol. 38, No. 3, Jul. 1998, pp. 105-110.

Iqbal, "A Logically Centralized Approach for Control and Management of Large Computer Networks," University of Pittsburgh, Dissertation, Dec. 14, 2012, 136 pages.

Lubbecke, et al., "Selected Topics in Column Generation," Operations Research, vol. 53, No. 6, Nov.-Dec. 2005, pp. 1007-1023.

Schmid, et al., "Exploiting Locality in Distributed SDN Control," HotSDN Aug. 16, 2013, Hong Kong China, 6 pages.

* cited by examiner

SYSTEM AND METHOD FOR OVERLAPPING RATE REGION ZONING

This application claims the benefit of U.S. Provisional Application No. 62/050,659 filed on Sep. 15, 2014 by Aaron Callard et al. and titled "System and Method for Overlapping Rate Region Zoning," and U.S. Provisional Application No. 62/057,111 filed on Sep. 29, 2014 by Aaron Callard et al. and titled "High Frequency Backhaul Design and Configuration," which are hereby incorporated herein by reference as if reproduced in their entirety.

TECHNICAL FIELD

The present invention relates to networking and wireless communications, and, in particular embodiments, to a system and method for implementing overlapping rate region zoning.

BACKGROUND

Traffic engineering (TE) refers to configuring data plane hardware, including various communications nodes of a network, to route traffic based on information collected from the network. TE is typically used to optimize or improve network traffic communications and resource utilization. Centralized TE may be computationally complex in large networks, and require control signaling that exhibits latency at the network edge. Alternatively, distributed TE architectures may divide the data plane of large networks into TE zones, which may be configured using distributed TE controllers and signaling. The network hardware and nodes are thus assigned to multiple zones, each being managed with less complexity and communication delay than managing the entire network in a central manner. The distributed approach also improves the scalability of implementation. However, since zones may pass traffic between each other, adjacent zones should coordinate their handling of traffic rate and other resources. This coordination can require extensive communication between the different zones, which can increase signaling overhead and latency. Thus, there is a need for schemes to handle traffic flow between zones. This is particularly true when wireless aspects are taken into account, because low latency is desired in wireless networks.

SUMMARY OF THE INVENTION

In accordance with an embodiment, a method for determining a network configuration to forward traffic between a first zone and a second zone in a network includes receiving, at a first zone controller, information indicating network capability. The information includes a plurality of parameters of a constraint function. The method further includes provisioning a network node to forward traffic from the first zone to the second zone in accordance with the received information.

In accordance with another embodiment, a method for determining a network configuration to forward traffic between a first zone and a second zone in a network includes receiving, at a second zone controller, a request to forward traffic from the first zone into the second zone, and sending, by the second zone controller, information indicating network capability, the information including a plurality of parameters of a constraint function. The method further includes receiving, from a first zone controller, an indication of at least one selected communication parameter for forwarding traffic from the first zone to the second zone.

In accordance with another embodiment, a network controller for determining a network configuration to forward traffic between a first zone and a second zone in a network includes a processor and a non-transitory computer readable storage medium for storing programming for execution by the processor. The programming includes instructions to receive information indicating network capability. The information includes a plurality of parameters of a constraint function. The programming includes further instructions to provision a network node to forward traffic from the first zone to the second zone in accordance with the received information.

In accordance with yet another embodiment, a network controller for determining a network configuration to forward traffic between a first zone and a second zone in a network includes a processor and a non-transitory computer readable storage medium storing programming for execution by the processor. The programming includes instructions to receive a request to forward traffic from the first zone into the second zone, and send information indicating network capability. The information includes a plurality of parameters of a constraint function. The programming includes further instructions to receive, from a second network controller, an indication of at least one selected communication parameter for forwarding traffic from the first zone to the second zone.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided for handling and managing traffic flow with network zoning by considering overlapping rate regions between zones. A rate region refers to the set of rates which can be supported by some portion of a network. In the simple case of a single wired link, the rate region is the set of all rates such that the capacity of that single link is not violated. This is often expressed as a series of linear constraints, such as:

$$\Sigma r_i \leq C.$$

An overlapping rate region refers to a rate region in which the constraints defining that rate region are from multiple zones (i.e., the rate region overlaps with the rate regions of other zones). This rate region (often expressed as constraints) can represent a communication capability of a zone to carry traffic, taking into account current network conditions and/or expected actions taken by other network entities such as those in other zones. A constraint can be further augmented by including a penalty such as a cost of not meeting the constraint. By taking into consideration the constraint information of the multiple zones involved in the traffic transfer, the embodiments can improve the response time of TE zoning. In addition to rate constraints, other information can be exchanged between the zones and used in the optimization of the TE zoning problem. For instance, utility functions considering optimization goals or conditions of the zones can also be exchanged and used in the optimization. Additionally, the optimization can also consider variables regarding the workings of the zones such as flows that are not transferred across the zones. The additional information can provide further optimization to the TE zoning problem.

When the TE zone includes a wireless component, these constraints become particularly difficult/expensive to express directly. Thus, other forms of expression can be used, such as conflict graphs, or the feasibility of sub problems, for instance a convex combination of multiple feasible rates.

Figure 1:
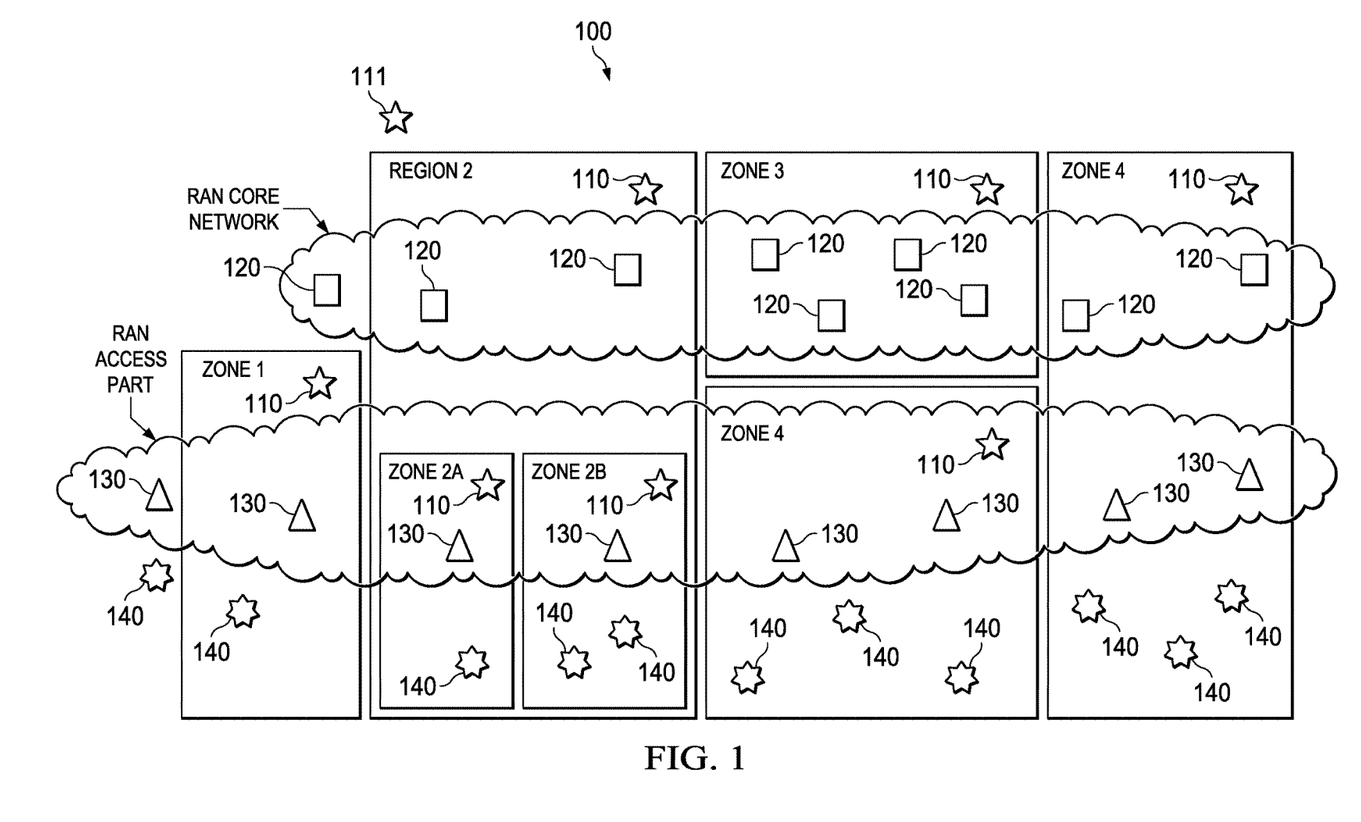
FIG. 1 illustrates an example of dividing a network into multiple zones.

FIG. 1 shows an example of dividing a network into multiple zones. The zoning is implemented in an area 100 of a software defined network (SDN) including a plurality of network nodes. The network nodes include core network nodes (e.g., routers) 120, base stations or transmission points (TPs) 130, and user equipment (UEs) 140. The nodes also include TE controllers 110, also referred to as software-defined networking (SDN) controllers. The nodes belong to a radio access network (RAN), which may be divided into a RAN core part and a RAN access part. The RAN core part includes the core network nodes 120, while the RAN access part includes the TPs. The SDN controllers 110 can be located in both parts. To improve response time and scalability of network operations, the network is divided into multiple zones (5 zones in this example). The number of zones can be determined according to at least one zone quantity parameter, such as expected zone TE complexity, network size, traffic load, flow information, or combinations thereof. The network nodes of the SDN are partitioned into the determined number of zones. Each zone is assigned a corresponding SDN controller. The SDN controllers are each configured to make TE decisions and carry out distributed network optimization for respective assigned network nodes in the assigned zone. Each zone can be controlled by a corresponding controller 110. The zoning provides distributed control of traffic and resources across the zones and can resolve network issues such as single point failures and node control by non-authorized entities.

A zone may cover nodes in the RAN access part, such as Zone 1, the RAN core part, such as Zone 3, or both RAN parts, such as Zone 4. A zone may also include sub-zones, such as Zone 2 that comprises Zones 2a and 2b. The controllers 110 in the zones can apply TE within their zones and interact between each other to perform distributed TE in the network. Optionally, a central controller 111 can further be used to manage the operations of the multiple zones. For traffic transferred between the zones, the involved zones or their zone controllers 110 may exchange signaling to optimize the zones resources for the transfer, for instance to set the traffic transfer rate. The signaling overhead may be significant as the amount of traffic and/or the number of involved nodes increases. The signaling overhead can be reduced by reducing the interaction between the zones or zone controllers 110 to set up the rates and resources for traffic transfer. The routing of traffic through the network with multiple controllers can be modeled as a distributed TE problem.

Figure 2:
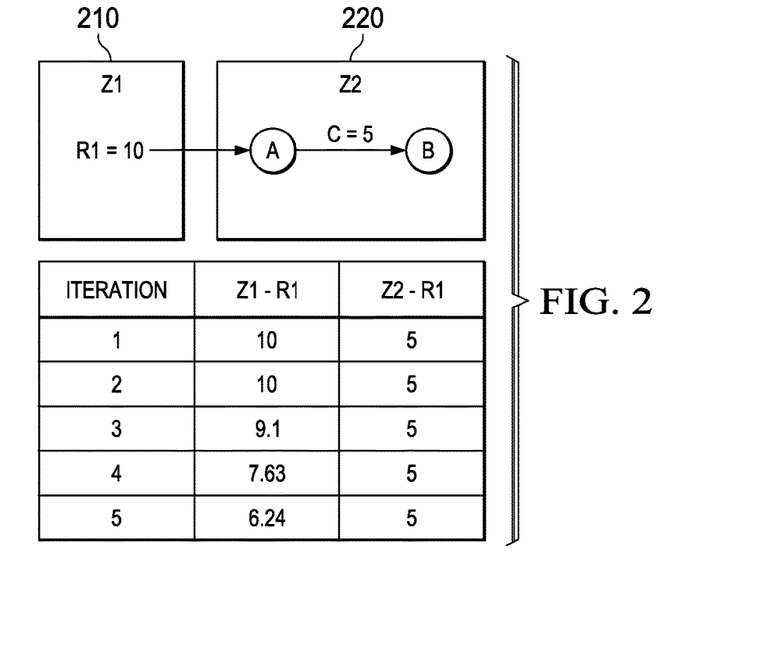
FIG. 2 illustrates a scenario of cost based traffic transfer between zones.

Typically, rate allocation in zoning may be based on cost exchanges between the zones. The cost may correspond to a rate requested or offered for transferring data traffic. FIG. 2 shows a scenario of such traffic transfer between adjacent zones. A first zone 210 (labeled Z1) includes one or more nodes that send data traffic to node B in a second zone 220 (labeled Z2). The traffic is to be transferred, in the second zone 220, on a link between node A and node B. According to cost based zoning, a zone controller of the first zone 210 requests from the second zone 220 to allocate a rate, e.g., 10 megabits/second or any other unit of rate, for transferring the traffic on the link between node A and node B. The second zone 220 responds by sending information indicating an available rate into the second 220, e.g., 5 units of rate. The exchange between the two zones may be iterated a number of times (e.g., 5 times as shown in the table of FIG. 2), until the first zone 210 requests an updated rate closer or more acceptable to the second zone 220. With this approach, the number of iterations may cause significant delay in response time to perform the requested traffic transfer between the zones. The iterations also require signaling to perform the exchanges.

In embodiments, the two zones exchange additional information related to their overlapping rate region. The exchange allows one zone to be able to anticipate the capability of the other zone to support this traffic, thus reducing the number of interactions needed. The information is used to apply constraints on the proposed interactions between zones. The constraints can be expressed as functions of particular traffic flows known to both zones, of paths taken by particular flows, or of collections of multiple traffic flows (also referred to as tunnels).

Typical exchanges of information include costs of particular rates/paths, or allowed rates for traffic. In the embodiments, this information extends cost information of particular rates/paths, or allowed rates for traffic, to functions of such rates. An example of such functions is a simple scaled linear combination, e.g., in the form $a \cdot r_1 + b \cdot r_2$, where a and b are variables, and r1 and r2 are the rates of two flows passing across the two respective zones. This information is used to apply constraints on the decisions made in the zoning optimization problem.

Other information can also be exchanged in addition to constraints, such as in the form of a utility function and/or variables for zone operations. This allows one zone to express the costs associated with particular actions (e.g., the cost of using links). For example, the constraint $a \cdot r_1 + b \cdot r_2 \leq C$ can be extended to $a \cdot r_1 + b \cdot r_2 + x \leq C$ with a penalty function $U_C(x)$. Thus, the second zone applies its optimization by minimizing the objective function as follows:

$$\min U(r) + U_C(x)$$

$$s \cdot t \cdot Ar \leq b, \text{ and}$$

$$a \cdot r_1 + b \cdot r_2 + x \leq C,$$

where $U(r)$ and $Ar \leq b$ are the internal zoning parameters.

The information exchanged may be derived directly from internal links within the zone (e.g., the information may reflect physical limitations in the network) or may reflect the output of the current state of an internal optimization. In one embodiment, the exchanged information may be all remaining resources in the neighboring zones, e.g., the remaining capacities on the links after subtracting any reserved resources.

In one approach, the variables or parameters associated with the constraints and any additional information can be resolved by a zone controller using an iterative algorithm that updates the values of the variables until suitable convergence is achieved. In another approach, a penalty function can also be considered in the solution. For example, the penalty function can represent a cost of using resources to satisfy the constraint. Using the constraint and optionally the additional information can reduce the solution time for the zoning problem and hence improve response time for zoning operations. For instance, a zone controller can determine the rate for traffic transferred between zones using a rate constraint imposed by a link or virtual link in one of the involved zones, e.g., at the outgoing or incoming zone.

In another approach, the parameters exchanged, such as the variable x above, represent actions taken at the network data plane. For example, x represents the traffic splitting ratio for a flow, or the parameter for a traffic shaping function. Thus, if a second zone receiving a traffic flow from a first zone has determined a solution which involves modifying x, it may be beneficial for the second zone controller to adjust that parameter in the data plane directly, instead of adjusting that parameter by the first zone controller upon receiving a response from the second zone. Thus, in addition to the indication of a parameter x, additional information related to what control plane actions (e.g., router table updates) should be taken if the value x is adjusted. Additional authorization steps may be taken to enable the second zone to take these actions, e.g., instruct some routers to implement commands received from the first zone.

In an embodiment, the constraint can be an expression indicating a communication capability limitation of a zone or network region to carry an amount of traffic. The communication capability limitation to carry some amount of traffic can be expressed using a linear function of known parameters, such as an inequality considering a rate and a capacity on a link in the second zone, the first zone or both. An example of such an inequality is: the rate r1 of flow 1 in zone 1+the rate r2 of flow 2 in zone 2<a given capacity C. The value C may change over time depending on network conditions. In this example, both r1 and r2 are known to the zone controllers of zones 1 and 2. In another embodiment, the constraint can be a more complex expression of the communication capability limitation for carrying an amount of traffic, such as in the case of wireless communications. For example, r1/spectral efficiency of user 1+r2/spectral efficiency of user 2<1. The expression of communication capability limitation can be generalized in the form of $Ax<b$, and solved as described below. The above formulations for the constraint imply that there is a fixed network capability which limits the scheduling of traffic. However, in some cases, the traffic can be managed according to some trade-off between the constraint and a cost or expense variable for violating the constraint. The price of this expense variable can be a function such as:

$$\text{price } e = \begin{cases} c \times e, & e < 100, \\ \infty, & e \geq 100. \end{cases}$$

In other embodiments, the constraint or communication capability limitation expressions can be exchanged between zones in the form of graph representations. Different types of graphs can be exchanged depending on the information expressed, such as conflict graphs possibly with rate exchanges, or connectivity graphs possibly with weights. Non-linear constraints may also be used, such as functions representing a probability of a link to support a given rate.

In one implementation, the constraint based problem to be solved can be in the form $Ax<=b$, where x is the rate variable or associated parameters to be allocated, b is a constraint representing the available rate by the second zone 220, and A is some function for mapping the rate variable x to the rate constraint b. For example, a simple mapping function is an indication of the remaining rates in the second zone 220. In another implementation, a utility function in addition to a rate constraint is used to form and accordingly solve the distributed TE problem for zone traffic. For example, the original utility function can consider other traffic flows in the second zone 220 that are not part of the traffic transfer from the first zone 210. The utility function may be a linear or non-linear function. Examples of the utility function include linear costs (e.g., Langrangian functions) or quadratic functions such as those used in alternating direction method of multipliers (ADMM) weights. Further utility functions related to network flows utility can also be used such as weighted alpha fairness, such as in the form of $(\omega x)^{1-\alpha}$. In yet another implementation, variables of operation, in either or both zones, that may be unrelated to the traffic transferred can also be considered in the problem/solution formulation, in addition to the rate constraint and/or the utility function. The variables, for example, may represent or be associated with goals or responsibilities for forwarding flows. The variables may also be part of the transferred utility function. The problem formulation based on the constraint, and optionally a utility function and/or variables, serve to reduce the solution convergence time or the number of possible solutions for rate allocation. A limit can be kept on what information are considered for the multiple zones in order to reduce the amount of information to be used in the solution or optimization of the zoning problem.

Figure 3:
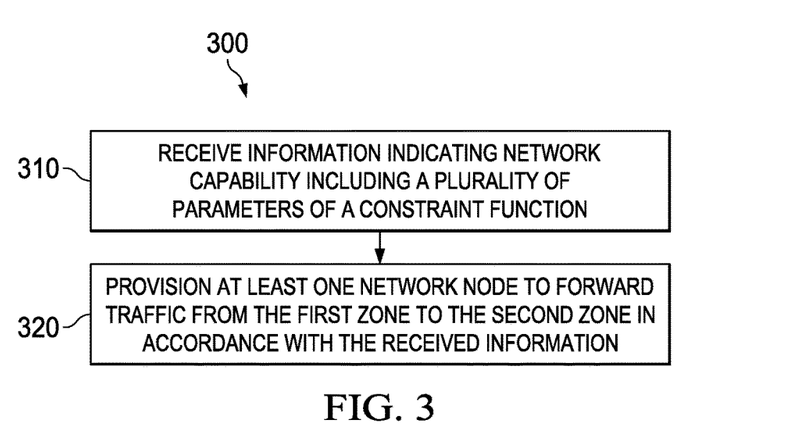
FIG. 3 illustrates an embodiment of a method for configuring a network to forward traffic between a first zone and a second zone in a network.

FIG. 3 shows an embodiment method to configure a network to forward traffic between a first zone and a second zone in a network.

FIG. 3 shows another embodiment method for configuring a network to forward traffic between a first zone and a second zone in a network. The method can be implemented by a first zone controller of the first zone in communications with a second zone controller of the second zone. At step 310, the first zone controller receives information indicating network capability including a plurality of parameters of a constraint function. The information can be sent by the second zone controller, another network controller or other component of the network. The information can include one or more variables relating to the constraint, e.g., one or more flow rates related to a capacity of a link or current traffic level in the second zone. At step 320, the first network controller provisions at least one network node, e.g., to forward traffic from the first zone to the second zone, in accordance with the received information. The node can be in the first zone, in the second zone, or a border node between the two zones.

Figure 4:
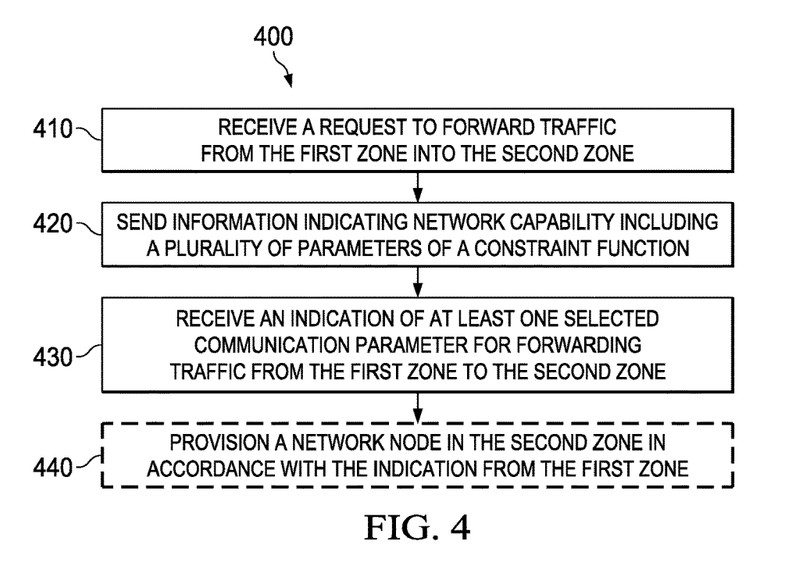
FIG. 4 illustrates another embodiment of a method for configuring a network to forward traffic flow between a first zone and a second zone in a network.

FIG. 4 shows another embodiment method for configuring a network to forward traffic from a first zone to a second zone in a network. The method can be implemented by a second zone controller of the second zone in communications with a first zone controller of the first zone. At step 410, the second zone controller receives a request to forward traffic from the first zone into the second zone. The request can be sent by the first zone controller, another network controller, or other component of the network. At step 420, the second zone controller sends information indicating network capability including a plurality of parameters of a constraint function. The information can include one or more variables relating to the constraint, e.g., one or more flow rates related to a capacity of a link or current traffic level in the second zone. At step 430, the second zone controller receives an indication of at least one selected communication parameter for forwarding traffic from the first zone to the second zone. The indication can be sent by the first zone controller or other network component. At an optional step 440, the second network controller provisions at least one network node, e.g., to forward traffic from the first zone to the second zone, in accordance with the received information. The node can be in the first zone, in the second zone, or a border node between the two zones.

Figure 5:
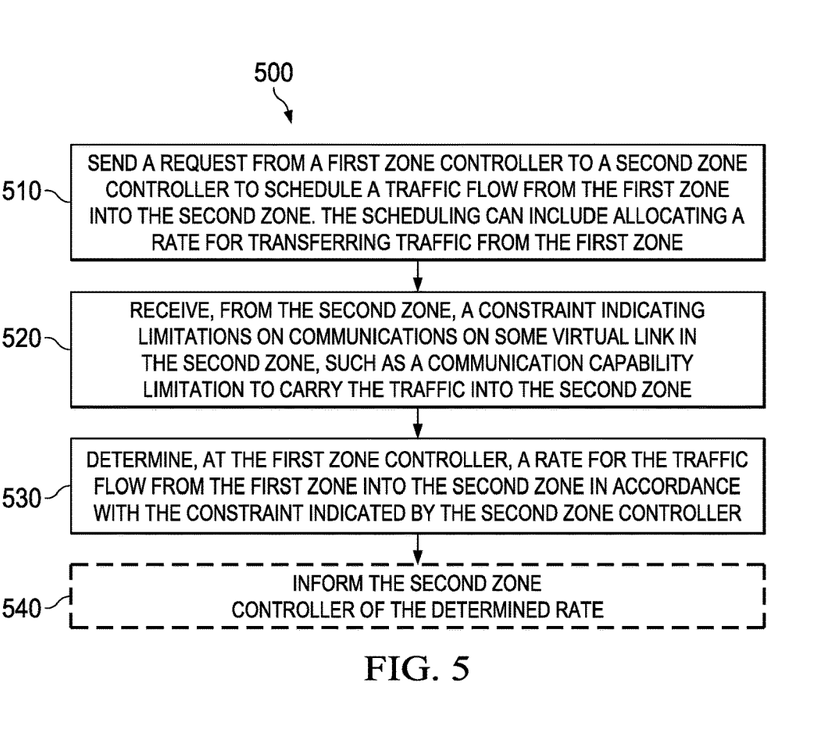
FIG. 5 illustrates an embodiment method for handling traffic flow between zones with overlapping rate regions.

FIG. 5 is a flowchart of an embodiment method 500 for implementing the overlapping rate region zoning. At step 510, a first zone controller sends a request to a second zone controller to schedule a traffic flow form the first zone into the second zone. The scheduling can include allocating a rate at a particular point for transferring traffic from the first zone. At step 520, the first zone receives from the second zone a constraint indicating limitations on communications, such as on some virtual link in the second zone. For instance, the constraint indicates a communication capability limitation to carry the traffic into the second zone. At step 530, the first zone controller determines a rate into the second zone for the traffic flow from the first zone in accordance with the constraint. At an optional step 540, the first zone controller informs the second zone controller of the determined rate. Subsequently, the second zone controller may schedule the incoming traffic flow according to the determined rate.

Figure 6:
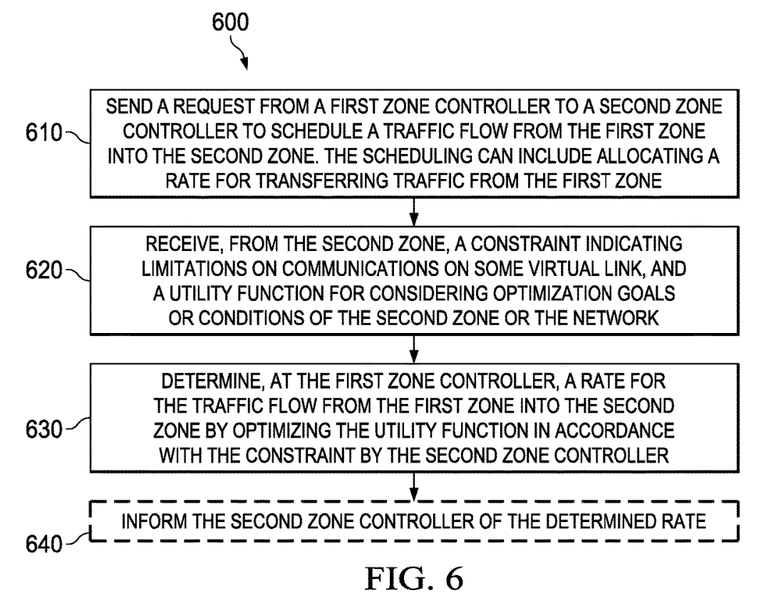
FIG. 6 illustrates another embodiment method for handling traffic flow between zones with overlapping rate regions.

FIG. 6 is a flowchart of an embodiment method 600 for implementing the overlapping rate region zoning. At step 610, a first zone controller sends a request to a second zone controller to schedule a traffic flow from the first zone into the second zone. The scheduling can include allocating a rate at a particular point for transferring traffic from the first zone. At step 620, the first zone receives from the second zone a constraint indicating limitations on communications, such as on some virtual link in the second zone, and a utility function for considering optimization goals or conditions of the second zone or the network. The utility function is intended to be used as part of the first zone's optimization for determining the rate considering goals or conditions for a virtual link. The virtual link can represent a plurality of traffic flows/links and resource in the second zone or the network in general. For example, the utility function can be in the form of a Langrangian function or a weighted function of variables associated with the flows/links in both zones. At step 630, the first zone controller determines a rate for the traffic flow that is transferred from the first zone to the second zone by optimizing the utility function in accordance with the constraint by the second zone controller. The optimization may affect one or more traffic flows on other links in the first zone, the second zone, or both. At an optional step 640, the first zone controller informs the second zone controller of the determined rate or rates for the corresponding link and possibly other links in the second zone. The second zone controller may schedule the incoming traffic flow according to the determined rate.

Figure 7:
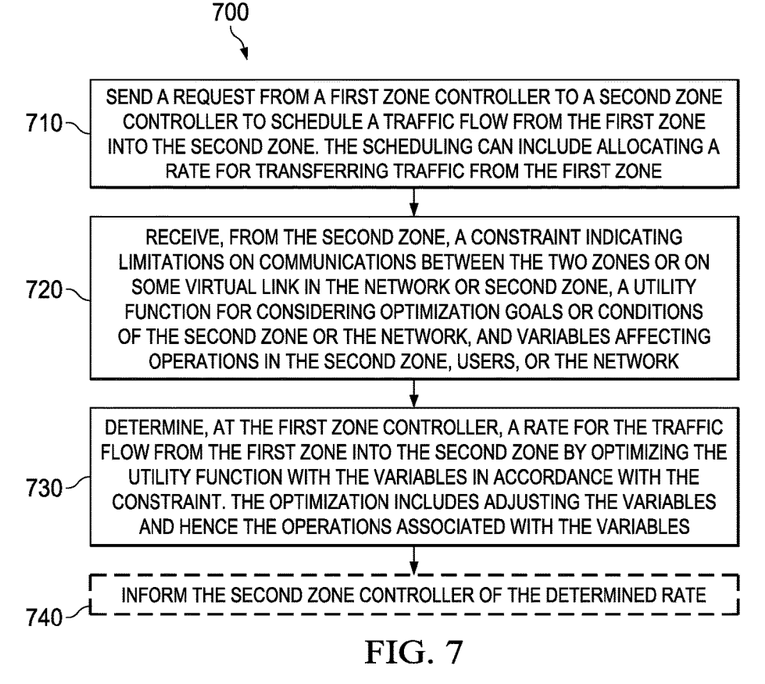
FIG. 7 illustrates another embodiment method for handling traffic flow between zones with overlapping rate regions.

FIG. 7 is a flowchart of an embodiment method 700 for implementing the overlapping rate region zoning. At step 710, a first zone controller sends a request to a second zone controller to schedule a traffic flow from the first zone into the second zone. The scheduling can include allocating a rate at a particular point for transferring traffic from the first zone. At step 720, the first zone receives from the second zone a constraint indicating limitations on communications, such as on some virtual link in the second zone, and a utility function for considering optimization goals or conditions of the second zone or the network. The second zone controller also indicates variables affecting operations in the second zone, users or the network, such as affecting links or rates of communications. The variables may be initialized, by the first zone, and then optimized as part of the utility function for determining the rate. At step 730, the first zone controller determines a rate for traffic flow that is transferred from the first zone to the second zone over a corresponding link by optimizing the utility function with the variables in accordance with the constraint. The optimization may affect one or more traffic flows on other links in the first zone, the second zone, or both. The optimization includes adjusting the variables and hence the operations associated with the variables. At an optional step 740, the first zone controller informs the second zone controller of the determined rate or rates for the corresponding link and possibly other links in the second zone. The second zone controller may schedule the incoming traffic flow according to the determined rate.

In an embodiment, the distributed TE problem is formulated to minimize a utility objective U of links L as:

$$\min U(d),$$

$$\sum_{j=1}^{l_k} x_{j,k} = d_k, k=1 \ldots K,$$

$$r \in R_j \supseteq j.$$

The parameters of the problem are summarized in Table 1 below. A plurality of zone controllers control the routers and wireless nodes to forward traffic on links L and adjust beam patterns. The zone controllers are in charge of the links L. The condition $r \in R_j$ is added if the rate vector is supported by the rate region $R_j$.

TABLE 1

Parameters in the formulation of the overlapping rate region problem

| Notation | Definition |
|---|---|
| $x_{j,k}$ | The rate transmitted on path j of flow k. |
| $d_k$ | The demand of flow k. |
| $p_j^k$ | The path j of flow k. |
| $r_l$ | The total amount of traffic flowing through link l $r_l = \Sigma_k \Sigma_{l \in p_j^k} x_{j,k}$ |
| $l_k$ | The number of paths for flow k |
| K | The number of flows |
| r | $[r_1 r_2 ... r_l]$ |

In a wireline network the constrains may be of the form $$r_l < C_l,$$

where $C_l$ is the capacity of link l. Wireless links can have significantly more complicated capacity regions, which can be expressed in an approximate representation.

According to an embodiment, the problem above can be solved using a baseline decomposition scheme that employs an ADMM algorithm with ADMM weights. The solution restricts the incoming rate to be equal to the outgoing rate at the edges of the considered zones. Slack variables can be introduced for the L links between the zones, such that each zone controller Z attempts to control a set of variables $Z_x$. The same variables $x_l^{z_i}$ can appear in multiple zones. Different slack variables can be introduced between zones, representing different communication delays. The network can be divided into a first region that includes the zone controllers where the optimization occurs, and a second region that includes the set of links/variables which exist in more than one zone. The links/variables can be optimized and updated independently by the respective zone controllers. Further, variables are introduced for each UE and each link or wireless link, as shown in Tables 2 and 3, respectively.

TABLE 2

Variables for each UE

| Notation | Definition |
|---|---|
| $x_{l,k}^{z_i}$ | The amount of data entering the link l, for flow k. The value of this variable is unknown to zone out. |
| $\hat{x}_{l,k}$ | The slack variable used to separate variables, essentially meaning the data requested to enter link l for flow k. |

TABLE 3

Variables for each link

| Notation | Definition |
|---|---|
| $r_l^{in}$ | The maximum rate which could pass into link l for all flows, as determined by zone in. |
| $\hat{r}_l$ | The slack variable used to separate variables, essentially meaning the requested maximum rate entering link l for all flows. |
| $r_l^{out}$ | As above but leaving the zone. |

To begin solving the above problem, the variables can be initialized to appropriate values. First, controller optimization is considered. For each node controller, only a subset of the total variables and constraints may be considered. Specifically, a zone controller uses all variables which pass through its links $X_j = \{x_{l,k} | l \in L\}$, and other links which affect the links $\{r_x | r_x \in R_j \text{ s.t. } \exists l \in L \text{ and } l \in R_j\}$. The calculation of the utility function may or may not require additional information or variables. For minimizing the objective function, a global minimum value is needed, as well as the rates delivered to each flow from other paths. Thus, each zone controller performs the following linear programming (LP) optimization:

$$\min U(d) + \sum_{l \in Z_i} \lambda_{x_{l,k}^{z_i}} (x_{l,k}^{z_i} - \hat{x}_{l,k}) + \rho \| x_{l,k}^{z_i} - \hat{x}_{l,k} \|^2,$$

$$r \in R_j \forall j.$$

The constraints $r \in R_j \forall j$ represent the ability for the zone to move traffic from incoming edges to outgoing edges. The function U(d) is a utility function of total rates. The utility function can be any suitable function representing a required utility or condition of operation on the links.

Next, the external variables to the zone of the controller are updated by matching the inputs and outputs on the shared links. Because the same link might be shared by multiple zones, all involved zones are considered simultaneously as follows:

$$\min_{\hat{x}} \sum_{z_i \text{ s.t. } l \in Z_i} \lambda_{x_{l,k}^{z_i}} (x_{l,k}^{z_i} - \hat{x}_{l,k}) + \rho \| x_{l,k}^{z_i} - \hat{x}_{l,k} \|^2.$$

This can be solved as shown below. The process is repeated for all border links over which traffic is transferred across zones. The solution can be in the form:

$$\frac{d}{dx} \left[ \min_{\hat{x}} \sum_{z_i \text{ s.t. } l \in Z_i} \lambda_{x_{l,k}^{z_i}} (x_{l,k}^{z_i} - \hat{x}_{l,k}) + \rho \| x_{l,k}^{z_i} - \hat{x}_{l,k} \|^2 \right] = \sum_{z_i \text{ s.t. } l \in Z_i} \lambda_{x_{l,k}^{z_i}} + 2\rho \hat{x}_{l,k} + 2\rho x_{l,k}^{z_i},$$

$$x = \text{mean}(x_{l,k}^{z_i}) + \frac{\text{mean}(\lambda_{x_{l,k}^{z_i}})}{2\rho},$$

$$\text{where mean}( ) \triangleq \frac{\sum_{i \in C}}{|C|}.$$

The value of $\rho$ can be tuned on a per link basis. The weights along all border links are then updated using the relation:

$$\lambda_{\hat{x}_{l,k}} = \lambda_{\hat{x}_{l,k}} + \rho(x_{l,k}^{in} - \hat{x}_{l,k}).$$

In another embodiment, the overlapping rate region problem can be solved using decomposition according to Lagrangian functions. In one approach, the whole network is known to a zone controller, including actions taken by other nodes. All path splitting solutions outside the zone of this controller are assumed fixed using a fixed subset of parameters, $x_{outside}$. The controller optimizes the solution over the remaining parameters, given constraints internal and external to this zone. To avoid having to pass all constraints to this zone, the constraints are passed only when a desired rate cannot be achieved, for example, if the zone cannot supply a rate r requested by another zone because of a constraint $A(:,j)x \le b_j$. During the exchanges between zones, the parameters $x_{outside}$ remain fixed.

Decomposition along the border links across zones is not needed in this approach but can be added to stabilize the solutions and allow for the zone to push other data away from the zone's links. Ideally, the border constraints would not be violated so the Lagrangian functions would be equal to zero in the decomposition. Instead of having a fixed external constraint, $\hat{x}$, a boundary function may be introduced to allow some flexibility in applying the constraint. For instance, a constraint can vary, based on data under the control of the zone controller, and can be fixed for external usage. Such a constraint can be written as:

$$A \begin{bmatrix} x \\ x_{outside} \end{bmatrix} \le b.$$

If the data associated with $x_{outside}$ could be rerouted or reduced (at a cost in utility), then the values of x could be increased, possibly increasing the total utility. If this could be known at the zone controller then only a single iteration may be required. The iterations represent the recalculation of the utility difference. At least a first order approximation (otherwise known as the Lagrangian of that path) can be passed to the adjacent zone controller, which then determines accordingly whether to override the associated resources. The zone controller can indicate to the other zone the determined value for $x_{outside}$. Alternatively, the first zone indicates to the second zone the values for both $x_{outside}$ and $\lambda$. In yet another implementation, the zone can send the values of A and $b-Ax_{outside}$, or the values for A, $b-Ax_{outside}$ and for the utility function and associated parameters (such as flow demand) for outside flows. Another option is sending to the second zone only a small subset of A at each iteration of the algorithm, for instance the values of which constraints are violated.

In another approach, the same value for the variable x is calculated by multiple zone controllers. An ADMM algorithm is used to ensure that the values of this variable calculated in the multiple zones converge to the same value after an acceptable number of iterations. In this solution, the decomposition is performed over the actions of every involved zone. Thus, local zone reactions can maximize performance, assuming operation parameters of every other zone remain constant. The variable x represents the actions taken by the entire network for path flows. The variable $\hat{x}$ represents the network wide actions recommended by the current zone controller, given its knowledge of the network. In this case, the problem formulation becomes:

$\min U(d),$ $\sum_{j=1}^{l_k} x_j^k = d_k, k=1 \ldots K,$ $r \in R_j \forall j.$ The extended problem formulation is thus:

$$L(d, x, \hat{x}) = U(d) + \lambda(x - \hat{x}) + \frac{\rho}{2}\|x - \hat{x}\|^2.$$

In this scenario, a network controller which controls links $L_k$ has control over any paths which affect its links, and can vary link activation. The variable x can represent path rates or path percentages.

In another approach, the impact of local decisions on the entire network is modeled external to the zone and passed to it. The complexity of this approach may be higher than the above approaches as many different options need to be considered. However, transmitting the final results may only take a small amount of resources. In this approach, a function $B(x)$ is exchanged/updated at every step or iteration:

$$B(x) = \sum_{l \in Z_i} \lambda_{x_{l,k}^{z_i}}(x_{l,k}^{z_i}) + \rho \|x_{l,k}^{z_i} - \hat{x}_{l,k}\|^2,$$

s.t. $Ax \le b.$

The constraints above ensure that the overall solution stays feasible while the function $B(x)$ pushes the solution towards convergence. The size of A and b in this case can be reduced using standard complexity reduction schemes because most constraints do not involve the variables in the adjacent zones involved in the exchange. In other embodiments, other approaches to solve the decomposition problem can be used, such as solutions using concave utility functions of users' rates.

The overlapping rate region zoning schemes above can be used, for example, in backhaul ultra-dense networks (UDNs). A UDN is a network comprising a relatively large number of network nodes, links or wireless links, and UEs. For each controller in the network, the variables can be divided into three sets including: a first set including a variable $I_l$ for each link l unknown or not observed by the controller; a second set including a variable $O_l$ for each link l observed by the controller; and a third set including a variable $C_l$ for each link l that is not controlled by the controller. The variables are dynamically changed within these sets, possibly at each iteration of the algorithm, although typically less frequently. Within one zone, the problem is formulated as:

$$L(d, x, \hat{x}) = U(d) + \sum_{i \in C_l \cup O_l} \left( \lambda_i(x_i - \hat{x}_i) + \frac{\rho}{2}\|x_i - \hat{x}_i\|^2 \right),$$

s.t. $Ax \le b,$ $x_i = 0 \, \forall \, i \in I_l.$

To solve the problem above, an algorithm is applied to the current sets of constraints and variables to optimize the utility function U. Accordingly, variables associated with adjacent zones are passed from one zone controller to another. On outgoing border links, the information includes the rate requested for different flows, and if there are constraints on rates (e.g., if there are demands which are fixed) then the constraints can be passed as well. Variables related to the constraints may also be passed between adjacent zones. For incoming border links, if the requested rate can be achieved, then no information is needed beyond indicating the acceptance of the request. However, if the rate cannot be achieved, then the constraint on that rate is passed. The decomposition procedure of any additional variables on that link is then started, as described above. The variables passed to a neighbor zone can be weighted using the weight factor X as follows:

$$L(d, x, \hat{x}) = U(d) + \lambda(x - \hat{x}) + \frac{\rho}{2}\|x - \hat{x}\|^2,$$

$\sum_{j=1}^{l_k} x_j^k = d_k, k = 1 \ldots K,$ $r \in R_j \, \forall \, j.$

At each iteration, the controller receives updates on the current values of the set of variables for links which the controller observes, as well as relevant constraints involving those links. Any variables involved in those constraints which are in the set of variables $I_I$ (the ignored set) can be replaced by a single variable. This variable can be initialized with a Lagrangian function.

Figure 8:
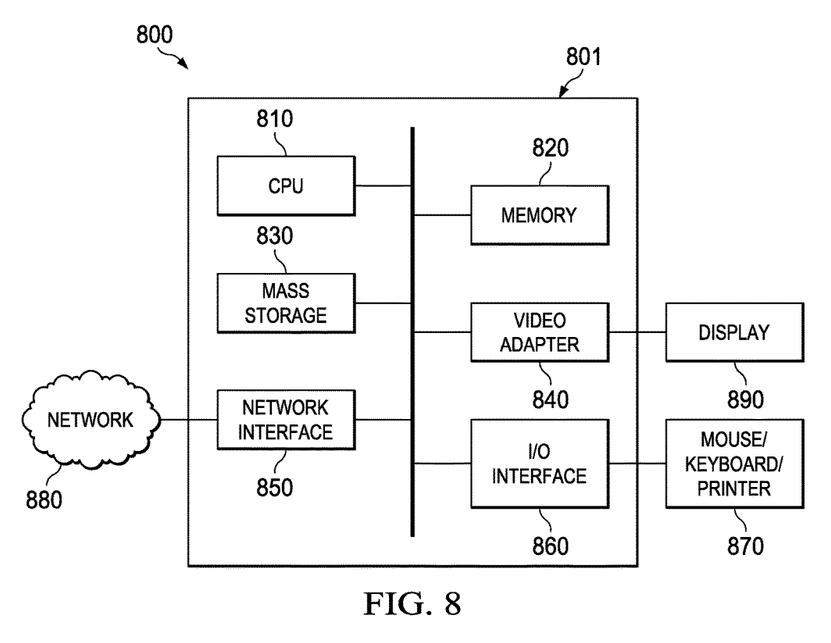
FIG. 8 is a diagram of a processing system that can be used to implement various embodiments.

FIG. 8 is a block diagram of a processing system 800 that can be used to implement various embodiments. For example, the system can be part of a network entity or component, such as a base station, a router, a server, or any controller component. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, a memory 820, a mass storage device 830, a video adapter 840, and an I/O interface 860 connected to a bus. The bus may be one or more of any type of several bus architectures including a memory bus or memory controller, a peripheral bus, a video bus, or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The video adapter 840 and the I/O interface 860 provide interfaces to couple external input and output devices to the processing unit. As illustrated, examples of input and output devices include a display 890 coupled to the video adapter 840 and any combination of mouse/keyboard/printer 870 coupled to the I/O interface 860. Other devices may be coupled to the processing unit 801, and additional or fewer interface cards may be utilized. For example, a serial interface card (not shown) may be used to provide a serial interface for a printer.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for determining a rate for transferring traffic from a first zone to a second zone in a network, the method comprising:
    receiving, by a first zone controller of the first zone, a constraint indicating limitations on communications in the second zone;
    receiving, by the first zone controller, a utility function for the second zone;
    determining, by the first zone controller, the rate for transferring the traffic to the second zone in accordance with the constraint and the utility function; and
    instructing, by the first zone controller, a node in the first zone to transfer the traffic to the second zone at the determined rate.

2. The method of claim 1, wherein the constraint comprises a rate limitation on a link or a virtual link in the second zone.

3. The method of claim 2, wherein the link in the second zone is a wireless link, or the virtual link in the second zone comprises at least one wireless link.

4. The method of claim 1, wherein determining comprises performing an optimization of the utility function in accordance with the constraint to determine the rate for transferring the traffic.

5. The method of claim 1, wherein the utility function is a Langrangian function or a weighted function of variables associated with links in the second zone.

6. The method of claim 1, wherein the utility function is a non-linear function, such as a quadratic function or a weighted alpha fairness function.

7. The method of claim 1, wherein determining comprises performing an optimization of the utility function and a penalty function in accordance with the constraint to determine the rate for transferring the traffic.

8. The method of claim 7, wherein the penalty function indicates a cost of using resources to satisfy the constraint.

9. The method of claim 7, wherein the penalty function indicates a cost of not meeting the constraint.

10. The method of claim 1, further comprising:
    transmitting, by the first zone controller, information indicative of the determined rate to a second zone controller of the second zone.

11. The method of claim 1, further comprising:
receiving, by the first zone controller, variables associated with actions taken at a network data plane of the second zone.

12. The method of claim 11, wherein determining comprises an optimization of the utility function and the variables in accordance with the constraint to determine the rate for transferring the traffic.

13. The method of claim 11, wherein the variables comprise a traffic splitting ratio for a traffic flow in the second zone.

14. The method of claim 11, wherein the variables comprise a parameter for traffic shaping in the network data plane of the second zone.

15. A network controller of a first zone in a network for determining a rate for transferring traffic from the first zone to a second zone in the network, the network controller comprising:
a non-transitory memory storage comprising instructions; and
one or more processors in communication with the memory storage, wherein the one or more processors execute the instructions to:
receive a constraint indicating limitations on communications in the second zone;
receive a utility function for the second zone;
determine the rate for transferring the traffic to the second zone in accordance with the constraint and the utility function; and
instruct a node in the first zone to transfer the traffic to the second zone at the determined rate.

16. The network controller of claim 15, wherein the constraint comprises a rate limitation on a link or a virtual link in the second zone.

17. The network controller of claim 16, wherein the link in the second zone is a wireless link, or the virtual link in the second zone comprises at least one wireless link.

18. The network controller of claim 15, wherein the instructions to determine the rate for transferring the traffic to the second zone in accordance with the constraint comprise the instructions to perform an optimization of the utility function in accordance with the constraint to determine the rate for transferring the traffic.

19. The network controller of claim 15, wherein the utility function is a Langrangian function or a weighted function of variables associated with links in the second zone.

20. The network controller of claim 15, wherein the utility function is a non-linear function, such as a quadratic function or a weighted alpha fairness function.

21. The network controller of claim 15, wherein the instructions to determine the rate for transferring the traffic to the second zone in accordance with the constraint comprise the instructions to perform an optimization of the utility function and a penalty function in accordance with the constraint to determine the rate for transferring the traffic.

22. The network controller of claim 15, wherein the one or more processors further execute the instructions to transmit information indicative of the determined rate to a second network controller of the second zone.

* * * * *